United States Patent

[11] 3,571,968

[72] Inventor Harvey W. Samo
 Maplewood, N.J.
[21] Appl. No. 824,409
[22] Filed May 14, 1969
[45] Patented Mar. 23, 1971
[73] Assignee Margon Corporation
 Rahway, N.J.

[54] TEARING DOLL EYE
 10 Claims, 13 Drawing Figs.
[52] U.S. Cl. .................................................. 46/135,
 46/165, 46/169
[51] Int. Cl. ........................................................ A63h 11/00
[50] Field of Search ............................................ 46/168,
 135, 165, 166, 167, 169

[56] References Cited
 UNITED STATES PATENTS
 3,019,551 2/1962 Brudney ..................... 46/169(A)
 3,444,645 5/1969 Tepper et al ................. 46/135(A)

Primary Examiner—Louis G. Mancene
Assistant Examiner—A. J. Heinz
Attorney—James and Franklin ABSTRACT: A tearing doll eye comprising a lens having pupil and iris portions made of a body of transparent material, the iris portion of the lens being provided at its rear face with means for producing iris lines and the lens being formed with a duct through the pupil portion thereof to provide a tearing outlet, the said duct being given a configuration such as to produce and maintain the intended simulative appearance of the pupil and the iris.

PATENTED MAR23 1971 3,571,968

INVENTOR
HARVEY W. SAMO
BY
James & Franklin
ATTORNEY

PATENTED MAR 23 1971

INVENTOR
HARVEY W. SAMO
BY
James & Franklin
ATTORNEY

INVENTOR
HARVEY W. SAMO
BY
ATTORNEY

TEARING DOLL EYE

The prime object of my present invention relates to the provision of a tearing doll eye having pupil and iris portions made of a body of transparent material, in which a duct or hole is formed through the pupil portion to provide an outlet for the flow of simulated tears, the structure of the duct being constructed and devised to avoid and nullify appearance defects normally incident to and accompanying the provision of such a duct.

Another prime object of the invention relates to the provision of such a tearing doll eye which may be embodied in a number of different structural styles of doll eyes such as fixed as well as movable doll eyes in which different standard means are used to produce and simulate the iris and pupil appearances and colorations.

One form of my present invention is applied and may be explained with reference to the "Transparent Doll Eye" of my U.S. Pat. No. 2,657,500 of Nov. 3, 1953. I there provide a doll eye comprising a lens having pupil and iris portions made of a body of transparent material, the pupil and iris portions both being devoid of extraneous or applied coloring means. The transparent pupil portion is nonreflective to incident light and the transparent iris portion is roughened or serrated on its back side to provide, in addition to iris lines, a roughened or serrated surface which is reflective to incident light and which thereby reflects light of a tint or color similar to that imparted to the transparent material. The transparent material is tinted, as for example, blue, brown or green where the color desired for the iris is blue, brown, or green, and is left untinted where the color desired for the iris is gray. When such an eye is associated with a dark background as by being mounted in a doll head or doll eye socket, or by blackening the inner end of the pupil, the nonreflective pupil portion appears black in exact simulation of a pupil and the reflective iris portion appears in the coloration, with suitable color tone or gradations, of the transparent material, in exact simulation of iris lines of the desired color.

When such a doll eye is modified for use as a tearing eye in conjunction with a tearing mechanism in a doll, and a duct or hole is formed through the center of the lens, namely through the pupil portion, to provide an outlet for the tearing water, a very unsatisfactory appearance is produced. Along frontal and angular sighting lines, the duct or hole in the center of the lens is found to be prominently visible, the pupil hole is seen surrounded by an annular area which when the eye is associated with a dark background presents a discernible black ring darker than the black eye pupil, and the inner wall of the straight pupil hole or duct reflects and presents an unsightly cylindrical structure appearance.

The same unsatisfactory appearance or visible defects are produced in other doll eye forms wherein the pupil and iris portions are made of a body of transparent material and a duct or hole is produced or formed through the pupil portion. Such other forms comprise the type of doll eye wherein the coloration for iris and pupil are supplied by internally spraying the iris area such as the area of a serrated iris, with the coloration desired for the iris, and the pupil is blackened at its inner end, and the type in which the iris lines and iris coloration are supplied by a color printed disc attached interiorly of the eye over the iris area and the pupil is blackened at its inner end.

I have found that when such doll eyes are formed with an angular, such as a conical, countersink in the lens at the front of the pupil hole, these undesirable appearance defects are eliminated. By the provision of such a countersink formation, the appearance of the surrounding annular area of the pupil stem and the resulting darker ring surrounding the black pupil are blotted out and the appearance of the cylindrical structure effect is eliminated. Moreover, the countersink creates at the said ring area an appearance of an internal continuation or extension of the iris area up to the inner wall of the pupil hole. Depending on the choice of angle, the depth and the shape (blending) chosen for the countersink, these desirable effects created will be maintained when the lens is viewed or sighted at an angle.

The overall prime object of the present invention is the production of tearing doll eyes which embody this referred to construction.

To the accomplishment of the foregoing objects and such other objects as may hereinafter appear, my invention relates to a tearing doll eye as more particularly described in the following specification and defined in the appended claims, and as shown in the accompanying drawings, in which:

Figure 1:
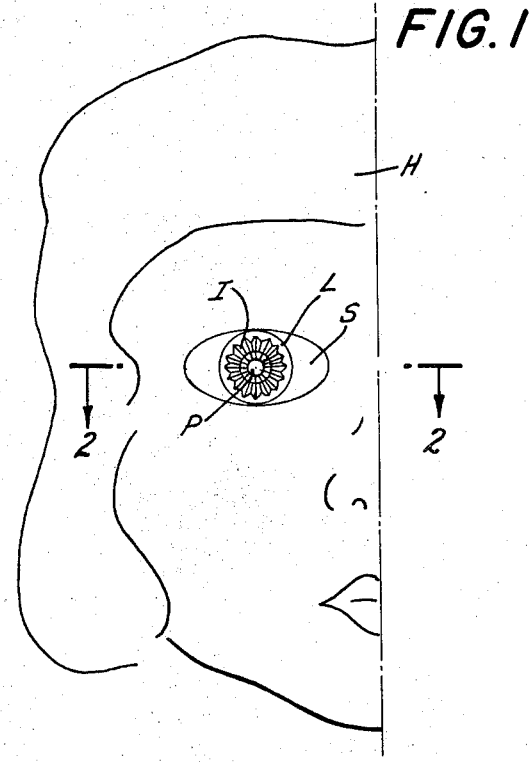
FIG. 1 is a view of a doll head showing one form of the tearing doll eye of the present invention applied to or mounted in a head.
Figure 2:
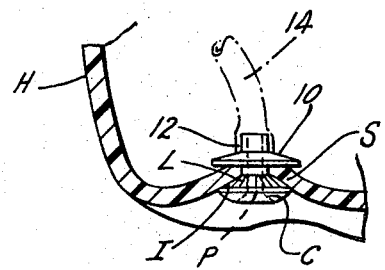
FIG. 2 is a fragmentary view of FIG. 1 taken in cross section in the plane of the line 2—2 of FIG. 1.

Referring now more in detail to the drawings and having reference first to FIGS. 1 and 2 thereof, the form of the tearing doll eye of the invention there shown is in the form of a stationary lens L fixed or mounted in a socket S of a doll head H, which lens may be held in the socket by means of a so-called "speed" nut 10. The eye lens L is formed with an inwardly extending tubular portion 12 for receiving flexible tubing 14, the latter being connectable to a water reservoir forming part of the doll tearing mechanism.

Figure 3:
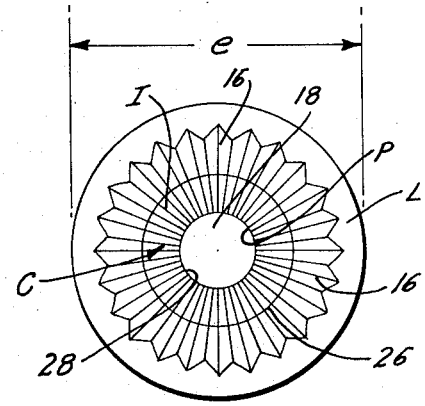
FIG. 3 is a top plan view of a doll eye lens of the form of the invention of FIGS. 1 and 2 depicting the effects produced thereby.
Figure 4:
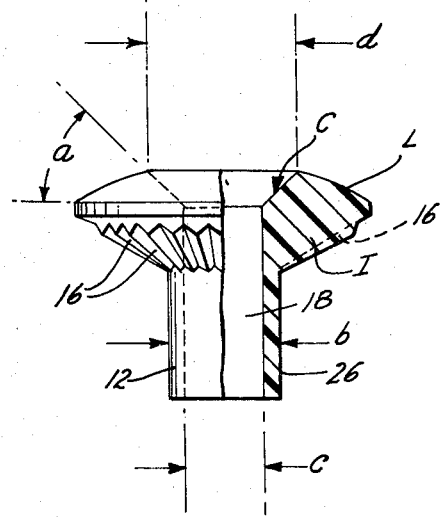
FIG. 4 is a vertical elevational view of the lens of FIG. 3 partly shown in section.

Referring now to FIGS. 3 and 4 of the drawings, the tearing doll eye of this described form of the invention comprises the lens L having a central pupil portion P and an iris portion I surrounding the pupil portion made of a body of transparent material, and in this invented form the transparent pupil portion is nonreflective to incident light, and the iris portion is serrated on its back face to provide the iris lines 16, and to render the iris portion reflective to incident light. To provide an outlet for the tearing water, a duct 18 is formed, either by being drilled through the lens pupil or produced in the molding thereof, through the center of the lens namely through the pupil portion P, said duct being extended through the tubular part 12 of the lens.

Figure 5:
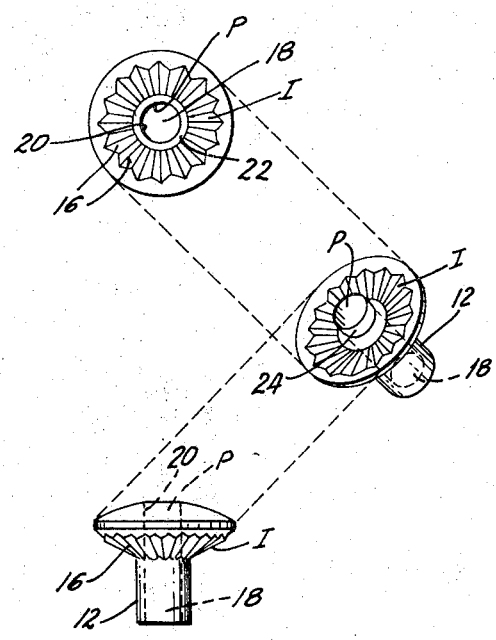
FIG. 5 are related views (plan, elevational and angular perspective) of the doll eye lens of this form of the invention, absent the particular improvement of the present invention, depicting the undesirable effects produced thereby.

In FIG. 5 of the drawings, I depict the lens structure as thus far described and the unsatisfactory appearances that result therefrom. As a result of this lens structure, the following unsatisfactory appearances are produced. The duct 18 in the center of the lens is found to be prominently visible at its periphery 20, the pupil hole 18 is seen surrounded by an annular area 22 which when the eye is associated with a dark background presents a discernible black ring darker than the black eye pupil in the area of the duct 18, and the inner wall of the straight pupil duct 18 reflects and presents an unsightly cylindrical structure appearance, represented by the part 24, prominently visible particularly when the lens is viewed at an angle as indicated by the perspective view of the lens depicted in this FIG. 5.

Figure 6:
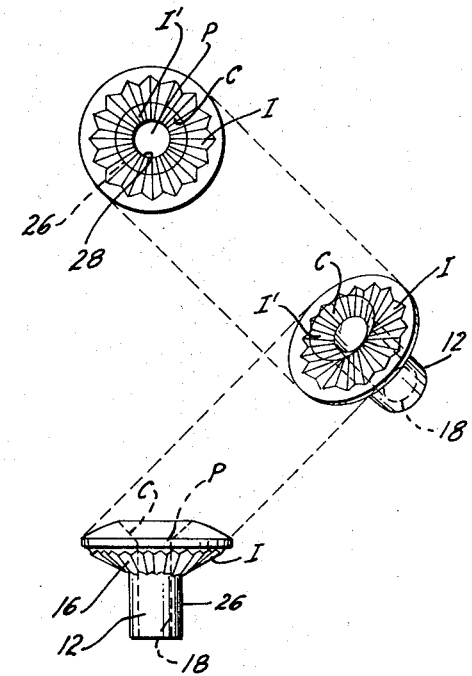
FIG. 6 are corresponding related views of such a doll eye lens, present the particular improvement of my invention, and depicting the favorable effects obtained thereby.

Reverting now to FIGS. 3 and 4 of the drawings, I have found that when a tearing doll eye such as thus far described is formed with an angular, such as a conical, countersink C in the lens at the front of the duct 18 of the pupil portion P, these undesirable appearance defects are eliminated. The countersink part C of the duct 18 is angular as shown in FIGS. 3 and 4 and is preferably conical in formation, light is internally reflected so as to blot out the appearance of the surrounding annular area (22 of FIG. 5) of the pupil stem eliminating the resulting darker ring surrounding the black pupil (when the eye is provided with a dark background or when the rear end of the pupil is blackened). Also as depicted in FIG. 6 of the drawings, the provision of this countersink C eliminates the appearance of the cylindrical structure effect (24 of FIG. 5); and moreover the internal reflection produced by the countersinking of the hole 18 creates in such ring area an appearance of an internal continuation or extension 1' of the iris area I, this latter being clearly depicted in FIGS. 1 and 3 of the drawings and in the plan view and perspective view of FIG. 6 of the drawings. It may be further noted that although the iris lines 16, 16 terminate at their inner ends at the outer wall 26 of the eye tubular extension 12, the iris area appears extended or continued up to the inner wall 28 of the pupil hole, as clearly depicted in these referred to FIGS. Depending on the choice of angle, the depth and the shape chosen for the countersink C, these desirable effects created will be maintained when the lens is viewed or sighted at an angle as will be clear from the effects described in connection with FIG. 6 of the drawings.

Reverting to FIGS. 3 and 4 of the drawings, the general range of angularity of the countersink C and the dimensions of the other parts of the lens L may be indicated. The angle $a$ of the countersink C can vary substantially and is shown in these FIGS. as 40°. The other indicated dimensions are as follow: $b$ is 0.195 inch; $c$ is 0.145 inch; $d$ is 0.265 inch; and $e$ is 0.500 inch.

Figure 7:
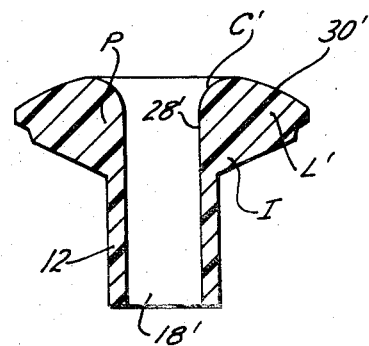
FIG. 7 is a vertical cross-sectional view of a modification of this form of the doll eye lens of the invention.

In FIG. 7 of the drawings, I show a modification comprising a lens L' similar to the form shown in FIGS. 3 and 4 having, however, an angular countersink C' formed by radii blending into the surface of the lens, namely the inner surface 28' of the 18' and the outer surface 30' of the lens thereby avoiding sharp lines of definition. The other parts of the lens L' are otherwise similar to the parts shown in FIGS. 3 and 4 of the drawings and are indicated by similar reference characters.

Figure 9:
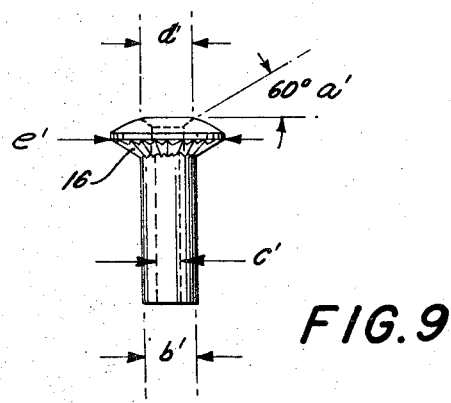
FIGS. 8 and 9 are plan and vertical elevational views of a dimensional variation of this doll eye lens of the invention for the production of miniature doll eyes.
Figure 8:
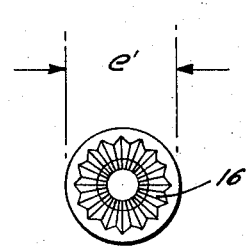

In FIGS. 8 and 9 of the drawings, I show a dimensional modification of this described form of the doll eye lens of the invention suitable for miniature eyes. The structure of this form of the invention is the same as that depicted in FIGS. 3 and 4 of the drawings; and it will only be relevant to indicate the dimensions of the various parts thereof. Thus in these FIGS. 8 and 9, the angle $a'$ of the countersink is 60°, and the other corresponding dimensions are as follows: $b'$ is one-eighth of an inch; $c'$ is one-sixteenth of an inch; $d'$ is one-eighth of an inch; and $e'$ is 0.250 inch. The serrations 16, 16 comprise 16 divisions each comprising a 0.220 diamond star.

Figure 10:
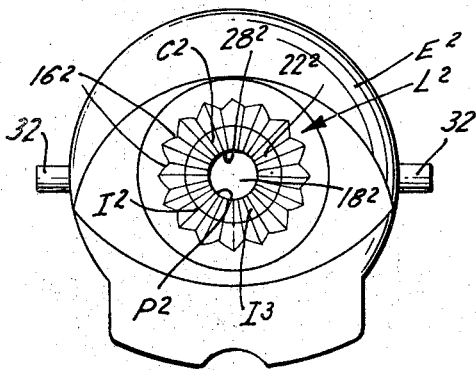
FIG. 10 is a front view of a movable doll eye of this invention showing a modified form thereof.
Figure 11:
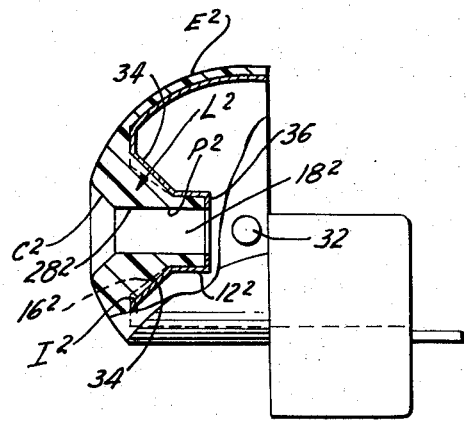
FIG. 11 is a vertical elevation of the doll eye of FIG. 10 with parts shown in section.

Referring now to FIGS. 10 and 11 of the drawings, I there show a movable type of doll eye $E^2$ pivotable on trunnions 32, provided with a lens section $L^2$ having a pupil portion $P^2$ and an iris portion $I^2$ made of a body of transparent material. The iris portion $I^2$ is serrated on its back face to provide the iris lines $16^2$, $16^2$. A duct or hole $18^2$ is formed through the pupil portion, said duct being extended through the tubular pupil part $12^2$ of the lens. The duct $18^2$ is formed with an angular countersink part $C^2$ at the front face of the lens, preferably conical in formation as shown.

For providing the colors for the iris, the interior of the doll eye is sprayed with the desired coloration, producing a color coating 34 which covers the iris area and also preferably the areas surrounding the iris. The pupil may be coated with a black film 36 at the annular area of the inner end of the tubular pupil part $12^2$.

Similar to the invented forms of FIGS. 1 to 9, the results due to the provision of the duct $18^2$ and the countersink $C^2$ at its outer end, are (a) that the appearance of a surrounding area ($22^2$) of the pupil stem that would take place, absent the countersink is blotted out, eliminating the resulting darker ring (of this area) surrounding the pupil, (b) the appearance of a cylindrical structure effect that would take place is eliminated and (c) there is created in this ring area $22^2$ an appearance (FIG. 10) of an internal continuation or extension $I^3$ of the iris area $I^2$, extending to the inner wall $28^2$ of the eye tubular part $12^2$, even masking the applied black film or coating 36.

Figure 12:
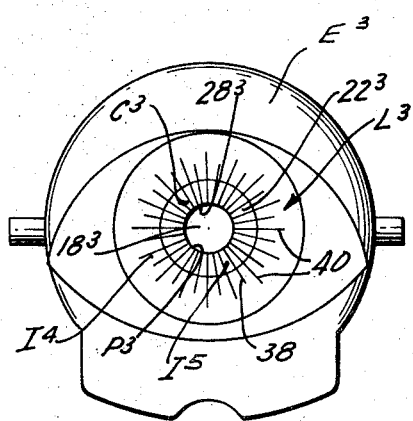
FIG. 12 is a front view of another modified form of the doll eye of the invention.
Figure 13:
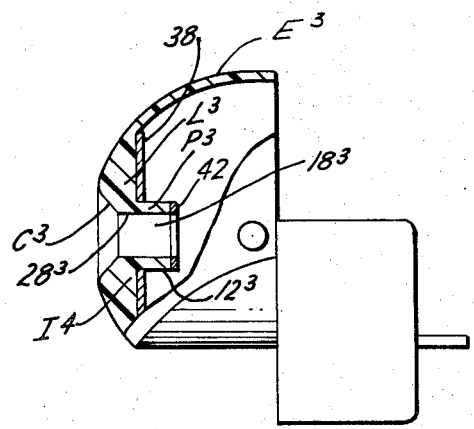
FIG. 13 is a vertical elevation of the doll eye of FIG. 12 with parts shown in section.

Referring now to FIGS. 12 and 13 of the drawings, I there show a movable type of doll eye $E^3$ provided with a lens section $L^3$ having a pupil portion $P^3$ and an iris portion $I^4$ made of a transparent material. A duct or hole $18^3$ is formed through the pupil portion, said duct being extended through the tubular part $12^3$ of the lens. The duct $18^3$ is formed with an angular countersink $C^3$ at the front face of the lens.

For providing the coloration, as well as the iris lines, for the iris, a color printed disc 38 also printed with iris lines 40 is attached interiorly of the doll eye over the iris area. Here too the pupil stem $12^3$ may be coated with a black film 42 over the annular inner end.

The results achieved are the same as those obtained with the doll eye of FIGS. 10 and 11; (a) the appearance of a surrounding area ($22^3$) of the pupil stem that would take place, absent the countersink $C^3$ is blotted out, thereby eliminating the resulting dark ring of this area surrounding the pupil, (b) the appearance of a cylindrical structure effect that would take place is eliminated, and (c) the appearance (FIG. 12) of an internal continuation or extension $I^5$ of the iris area $I^4$, extending to the inner wall $28^3$ of the tubular part $12^3$, is created, even masking the applied black film or coating 42. The blackness of the pupil is achieved by mounting the eye (and also that of FIGS. 10 and 11) in a dark enclosure.

The structure use, functioning and advantages of the improved tearing doll eye of the present invention will be apparent from the above detailed description thereof and it will be further apparent that various structural and physical changes may be made without departing from the spirit of the invention and the scope of the following claims.

I claim:

1. A doll eye comprising a lens having pupil and iris portions made of a body of transparent material, the iris portion of the lens being provided at its rear face with means producing iris lines, the said lens being formed with a central duct through the pupil portion, the said central duct being formed with an angular countersink at the front face of the lens.

2. The doll eye of claim 1 in which the countersink part of the central duct is conical in formation.

3. The doll eye of claim 1 in which the pupil portion is formed with an inwardly extending extending tubular portion adapted to receive a conduit of a doll tearing mechanism.

4. The doll eye of claim 1 in which the rear face of the iris portion of the lens is serrated to provide the iris lines.

5. The doll eye of claim 1 in which the means provided at the rear face of the iris portion of the lens to produce the iris lines comprises an applied colored disc which also produces the coloration for the iris.

6. The doll eye of claim 1 in which the rear face of the iris portion of the lens is serrated to provide iris lines and the body of the transparent material is tinted to provide the coloration for the iris.

7. The doll eye of claim 4 in which the rear end of the pupil portion is colored black.

8. The doll eye of claim 5 in which the rear end of the pupil portion is colored black.

9. The eye of claim 6 in which the rear end of the pupil portion is colored black.

10. A doll eye comprising a lens having pupil and iris portions made of a body of transparent material, the transparent pupil portion being nonreflective to incident light and the transparent iris portion being serrated on its rear face to provide iris lines and to render the iris portion reflective to incident light, the said lens being formed with a central duct through the pupil portion thereof, the said central duct being formed with an angular countersunk part at the front face of the lens.